No. 726,019. PATENTED APR. 21, 1903.
S. J. BRIDEN.
LINOTYPE MACHINE.
APPLICATION FILED JAN. 22, 1903.
NO MODEL. 2 SHEETS—SHEET 2.
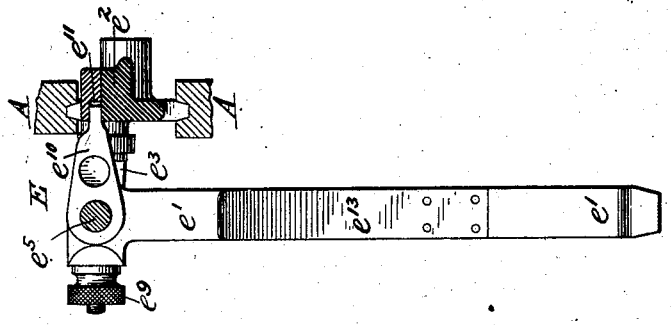
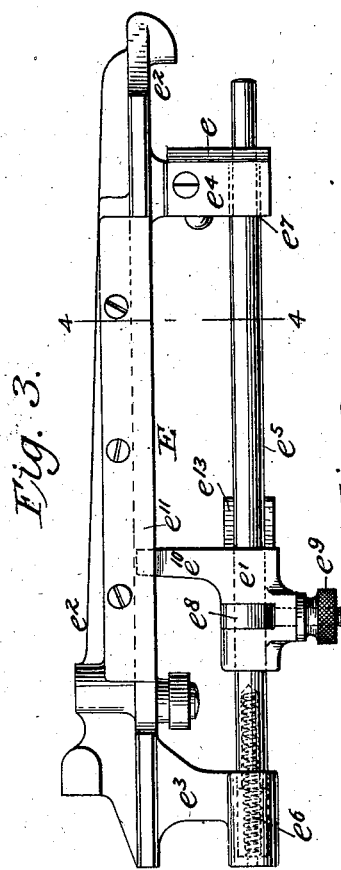
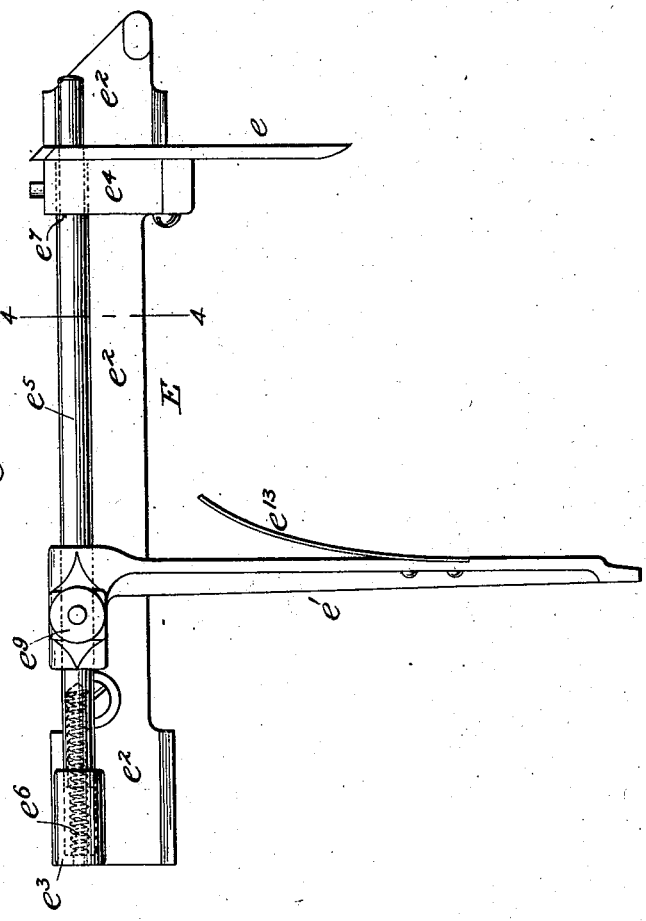
WITNESSES: INVENTOR
BY Attorney

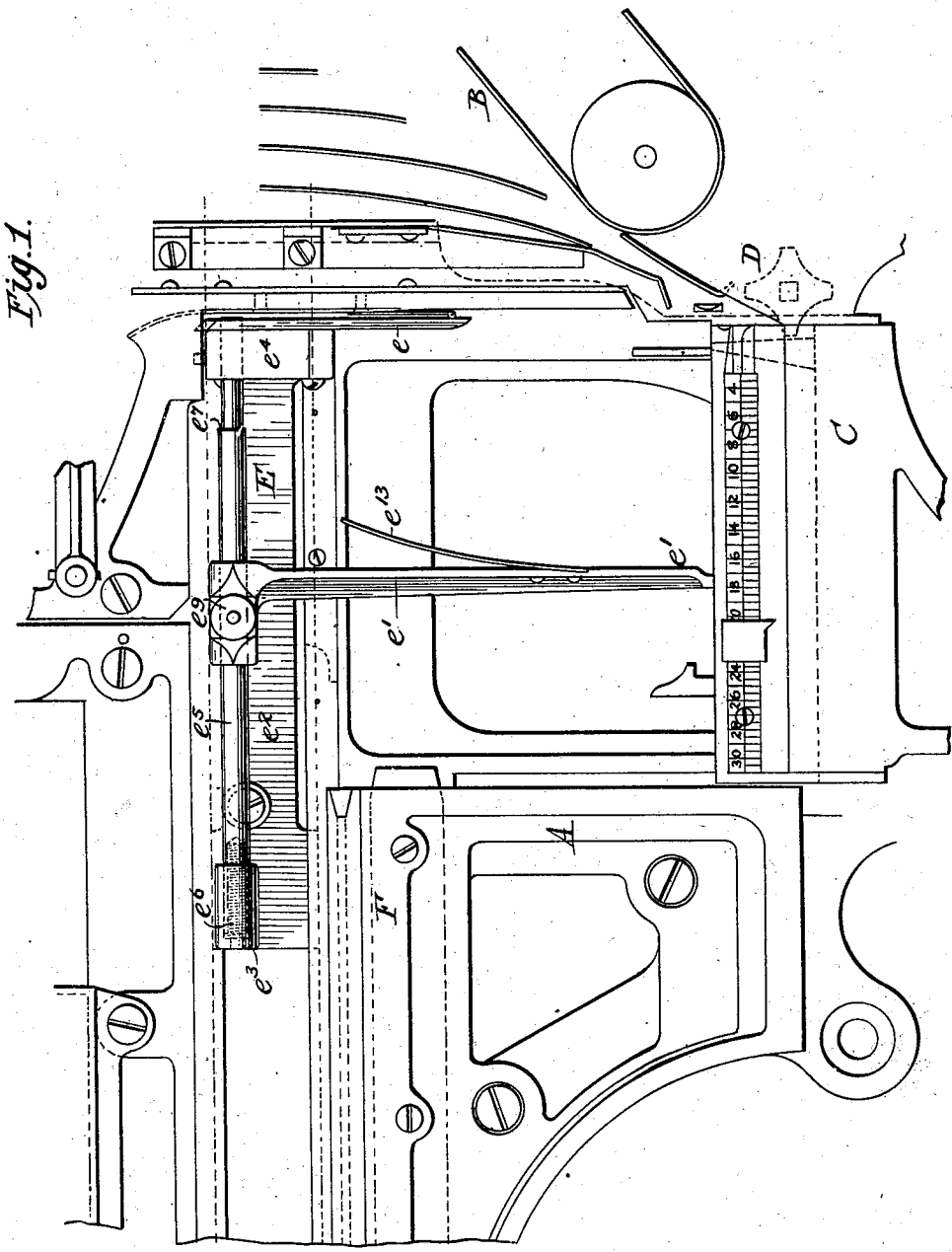

UNITED STATES PATENT OFFICE.

SAMUEL J. BRIDEN, OF BROOKLYN, NEW YORK, ASSIGNOR TO THE MERGENTHALER LINOTYPE COMPANY, A CORPORATION OF NEW YORK.

LINOTYPE-MACHINE.

SPECIFICATION forming part of Letters Patent No. 726,019, dated April 21, 1903.

Application filed January 22, 1903. Serial No. 140,064. (No model.)

*To all whom it may concern:*

Be it known that I, SAMUEL J. BRIDEN, of Brooklyn, county of Kings, and State of New York, have invented a new and useful Improvement in Linotype-Machines, of which the following is a specification.

My invention has reference to the Mergenthaler linotype-machines and kindred machines wherein single-letter matrices are assembled in line, the composed line presented to a mold in which the slug or linotype is formed, and the line thereafter disintegrated and the individual matrices returned to the magazine from which they started.

The invention has reference particularly to means for transferring the composed or assembled line of matrices and spacers from the point of assemblage to the devices by which it is transferred to the mold.

In the Mergenthaler machine of commerce (represented as to its principal features in United States Patent No. 436,532) the matrices are assembled or composed in a channeled elevator which is raised for the purpose of presenting the line between two fingers depending from horizontal slides which are moved to the left for the purpose of transferring a line to the first elevator.

The aim of my invention is to do away with the two slides and to provide a single carriage having the transfer-fingers, with the necessary provision for changing the distance between the fingers according to the length of the line required and for permitting one finger to yield in relation to the other that the matrices may be held in compact form, notwithstanding the variations in the length of the unjustified line.

Referring to the drawings, Figure 1 represents in front elevation the assembling mechanism of a linotype-machine and my improved carriage in operative relation thereto. Fig. 2 is a front elevation of the carriage. Fig. 3 is a top plan view of the same; Fig. 4, a vertical cross-section on the line 4 4 of the two preceding figures.

Referring to the drawings, A represents the stationary frame of the machine; B, the usual inclined apron by which the individual matrices falling from the magazine are delivered downward into the channeled assembler C in front of the star-wheel D, by which they are forced laterally into the assembler and the composed line urged forward in order to leave room at the rear end for the entrance of the successive matrices. All of the foregoing parts are constructed and operated in the usual manner.

E represents the horizontally-moving carriage forming the subject of my invention. It is mounted to slide in a suitable guideway in the main frame and is provided with two depending fingers $e$ $e'$, having a normal separation slightly greater than that of the composed line, so that when the elevator C is lifted in the usual manner it will carry the line of matrices upward between the fingers $e$ $e'$ in order that when the carriage E is moved to the left the line will be shifted horizontally out of the elevator and through the intermediate channel or guideway F to the second elevator, as usual.

The carriage E, as shown in Figs. 2, 3, and 4, consists, primarily, of a horizontal casting or body portion $e^2$, having at or near its opposite ends the forwardly-projecting lugs $e^3$ and $e^4$. The upper and lower edges of this casting are adapted to slide in grooves or guideways in the main frame A, as shown in Fig. 4. To the right-hand lug $e^4$ the depending finger $e$, already referred to, is rigidly secured by screws or equivalent fastening devices. The opposing finger $e'$ is mounted at its upper end on a horizontal rod $e^5$, mounted to slide endwise in the lugs $e^3$ $e^4$. This rod is urged constantly to the right by a spring $e^6$, seated in its left end and bearing against the lug $e^3$. Its movement to the right is limited by an annular shoulder $e^7$, formed thereon and bearing against the side face of the lug $e^4$. This arrangement permits the rod $e^5$ and the finger $e'$ to yield slightly to the left when moderate pressure is applied and this for the purpose of permitting the composed line to be crowded upward between the two fingers, so that it is certain to be held between them with a yielding pressure, although the length of the successive lines differs somewhat previous to justification.

The finger $e'$ is drilled through its upper end to permit the passage of the rod, on which it may be moved to the right or left, according to the length of the line to be produced. The finger is secured in the required position by means of an eyebolt $e^8$, seated in a slot in the upper end of the finger and encircling the rod and having on one side a threaded shank carrying a thumb-nut $e^9$. By tightening this nut the bolt is caused to bind strongly against the rod, and thus secure the finger rigidly thereon in the required position.

In order to guide the finger accurately as it moves to the right and left and prevent its lower end from swinging forward or backward, it is formed, as shown in Figs. 3 and 4, with a rear projection $e^{10}$, arranged to slide in a horizontal groove $e^{11}$ in the frame or body portion $e^2$.

I prefer to apply to the inner side of the finger $e'$ a spring $e^{13}$, secured thereto at the lower end and diverging therefrom toward the upper end, this for the purpose of applying a yielding pressure and endwise compression to the matrix-line as it is carried upward between the fingers. This spring, however, as applied to the ordinary transfer-carriage is not separately considered of my invention and is not claimed herein.

When the carriage is moved to the right to its position of rest or receiving position, the end of the rod $e^5$ contacts with the frame of the machine, as shown in Fig. 1, the effect being to compress the spring $e^6$ and hold the finger $e'$ its maximum distance from finger $e$, thus permitting the composed line to rise freely between the fingers when the assembler C is raised.

When the carriage is removed and starts forward to the left, carrying the line of matrices, the end of the rod leaves the frame and the finger $e'$ is pushed to the right by the spring $e^6$, so that the line of matrices is properly confined between the fingers during its transfer.

It will be observed that the spring $e^{13}$ serves to hold the matrices in compact form while being raised between the fingers and before the latter are closed together. This is of importance when the composed unjustified line of matrices is exceptionally short, since it prevents the possibility of their twisting or turning out of position or of their "squabbling" or falling through the assembler.

Having thus described my invention, what I claim is—

1. In a linotype-machine, the line-transferring carriage comprising the body portion and the finger rigidly attached thereto, in combination with the longitudinally-yielding rod, the finger thereon and the spring acting on the rod.

2. In a transferring-carriage for a linotype-machine, a slide provided with a rigid depending finger, a longitudinally-movable rod mounted therein, a spring tending to urge the rod in one direction, and a depending finger adjustably secured to the rod.

3. In a line-transferring carriage for a linotype-machine, a horizontal slide provided with a depending finger, a horizontal longitudinally-movable rod mounted in said slide, a spring tending to urge the rod endwise, and a second finger secured to the rod and provided with a guiding-arm engaging a guide in the slide.

4. In a transfer-carriage for a linotype-machine, a slide $e^2$ provided with a finger $e$, in combination with a rod $e^5$, spring $e^6$, finger $e'$ mounted on the rod, and means for adjustably securing the finger in position thereon.

5. In the transfer-carriage for a linotype-machine, a slide $e^2$, a longitudinally-yielding rod $e^5$ mounted thereon, and a finger $e'$ mounted on the rod, and a clamping device $e^8$ engaging the rod to hold the finger in position thereon.

6. In a linotype-machine, a carriage provided with a finger to transfer the matrix-line, and also with a laterally-yielding spring-actuated finger to confine the line at the forward end, means for maintaining the separation of the fingers when the carriage is in the receiving position, and a spring located on the inner surface of the yielding finger to act upon the matrix-line as it is raised between the fingers.

7. In a line-transferring carriage for a linotype-machine, comprising the slide or body, a rigid or depending finger, a second depending finger, a spring permitting the second finger to yield laterally, and a spring carried by said finger to act on the end of the matrix-line.

In testimony whereof I hereunto set my hand this 15th day of January, 1903, in the presence of two attesting witnesses.

SAMUEL J. BRIDEN.

Witnesses:
 JNO. BLANCK,
 HERMAN F. VOSS.